(12) United States Patent
Chen et al.

(10) Patent No.: US 11,084,215 B2
(45) Date of Patent: Aug. 10, 2021

(54) SYSTEMS AND METHODS FOR FABRICATING THREE-DIMENSIONAL CONDUCTIVE ELECTRODES

(71) Applicant: Trustees of Boston University, Boston, MA (US)

(72) Inventors: Christopher S. Chen, Newton, MA (US); Subramanian Sundaram, Brookline, MA (US); Christos Michas, Allston, MA (US); Alice E. White, Brookline, MA (US); David J. Bishop, Brookline, MA (US)

(73) Assignee: TRUSTEES OF BOSTON UNIVERSITY, Boston, MA (US)

( * ) Notice: Subject to any disclaimer, the term of this patent is extended or adjusted under 35 U.S.C. 154(b) by 0 days.

(21) Appl. No.: 16/824,292

(22) Filed: Mar. 19, 2020

(65) Prior Publication Data

US 2020/0298490 A1    Sep. 24, 2020

Related U.S. Application Data

(60) Provisional application No. 62/820,510, filed on Mar. 19, 2019.

(51) Int. Cl.
  *B29C 64/30* (2017.01)
  *B22D 18/04* (2006.01)
  (Continued)

(52) U.S. Cl.
  CPC .............. *B29C 64/30* (2017.08); *B22D 18/04* (2013.01); *B29C 64/106* (2017.08); *B33Y 10/00* (2014.12); *B33Y 30/00* (2014.12)

(58) Field of Classification Search
  CPC ........ B22D 17/04; B22D 17/06; B22D 18/00; B22D 18/04; H05K 3/101; B23H 1/04; B01L 3/5027; B29C 64/30; B29C 64/106
  See application file for complete search history.

(56) References Cited

U.S. PATENT DOCUMENTS

2007/0066090 A1    3/2007  Ono
2009/0185955 A1    7/2009  Nellisen
(Continued)

FOREIGN PATENT DOCUMENTS

CN        108788343 A      11/2018
WO    WO 2007/133258 A2    11/2007
WO    WO 2017/038714 A1     3/2017

OTHER PUBLICATIONS

Coenjarts et al. "Two-Photon Three-Dimensional Microfabrication of Poly(Dimethylsiloxane) Elastomers". Chemistry of Materials, 16(26), 5556-5558. doi: 10.1021/cm048717z (Year: 2004).*

(Continued)

*Primary Examiner* — Kevin P Kerns
*Assistant Examiner* — Steven S Ha
(74) *Attorney, Agent, or Firm* — Nixon Peabody LLP

(57) ABSTRACT

A method for fabricating an electrode includes forming a 3D shell having a hollow interior and defining one or more openings, and directing an electrically conductive liquid through at least one of the one or more openings of the 3D shell, such that the 3D shell is at least partially filed with the electrically conductive liquid. The electrically conductive liquid can be caused to solidify within the 3D shell to form a solid electrode, or can remain a liquid to form a liquid electrode. The 3D shell can be formed having the one or more openings using a 3D printing process such as a two-photon writing system. The surface tension of the electrically conductive liquid aids in retaining the electrically conductive liquid within the 3D shell. The electrode can contact a tissue sample through one of the openings in the 3D shell.

24 Claims, 11 Drawing Sheets

(51) Int. Cl.
  *B33Y 30/00* (2015.01)
  *B33Y 10/00* (2015.01)
  *B29C 64/106* (2017.01)

(56) References Cited

U.S. PATENT DOCUMENTS

| | | |
|---|---|---|
| 2011/0045577 A1 | 2/2011 | Bruzewicz |
| 2011/0216804 A1 | 9/2011 | Roukes |
| 2012/0067379 A1 | 3/2012 | Okamoto |
| 2016/0293722 A1 | 10/2016 | Nijhuis |
| 2018/0205113 A1* | 7/2018 | Golodnitsky .......... H01G 11/08 |

OTHER PUBLICATIONS

Smith, D.R. et al., "Metamaterials and Negative Refractive Index," Science, vol. 305, Issue 5685, Aug. 6, 2004, pp. 788-792.
Dandavino, S. et al., "Microfabricated electrospray emitter arrays with integrated extractor and accelerator electrodes for the propulsion of small spacecraft," J. Microtech. Microeng., vol. 24, No. 7, Jun. 5, 2014 (13 pages).
Kumar, S., "Trefoil Torus Knot Monopole Antenna," IEEE Antennas and Wireless Propagation Letters, vol. 15, 2016, pp. 464-467.
Zhang, Y. et al., "Printing, folding and assembly methods for forming 3D mesostructures in advanced materials," Nature Reviews, vol. 2, No. 4, Apr. 2017, pp. 1-17.
Song, H.H. et al., "Vascular Tissue Engineering: Progress, Challenges, and Clinical Promise," Cell Stem Cell, vol. 22, No. 5, Mar. 1, 2018, pp. 340-354.
International Search Report and Written Opinion for Application No. PCT/US2020/023635, dated Aug. 31, 2020 (19 pages).
Liao, et al.; "Two-Photon Nanolithography of Tailored Hollow three-dimensional Microdevices for Biosystems"; ACS Omega, vol. 4, pp. 1401-1409; Jan. 16, 2019 [retrieved on Aug. 9, 2020]. Retrieved from the Internet: <URL: https://pubs.acs.org/doi/10.1021/acsomega.8b03164> (9 pages).

* cited by examiner

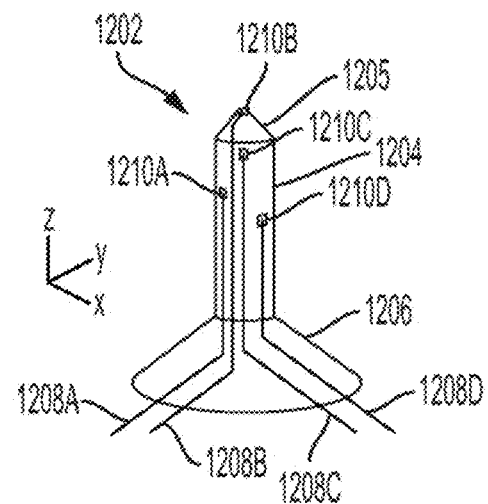
FIG. 12
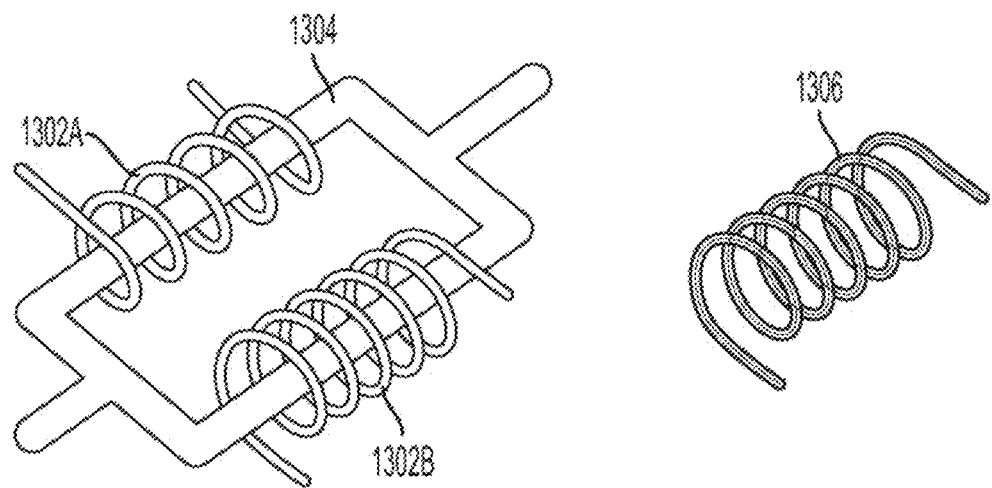
FIG. 13A
FIG. 13B

SYSTEMS AND METHODS FOR FABRICATING THREE-DIMENSIONAL CONDUCTIVE ELECTRODES

CROSS-REFERENCE TO RELATED APPLICATIONS

This application claims the benefit of and priority to U.S. Provisional Patent Application Ser. No. 62/820,510, filed on Mar. 19, 2019, entitled "FREE-FORM, CONDUCTIVE ELECTRODES FOR 3D ELECTRICAL INTERFACES TO CELLS AND TISSUES," which is hereby incorporated by reference herein in its entirety.

STATEMENT REGARDING FEDERALLY SPONSORED RESEARCH OR DEVELOPMENT

This invention was made with government support under Grant No. EEC-1647837 awarded by the National Science Foundation. The government has certain rights in the invention.

TECHNICAL FIELD

The present disclosure relates to methods of forming electrodes. Specifically, the present disclosure relates to methods of forming three-dimensional electrodes for interfacing with cells and tissue.

BACKGROUND

Historically, it has been difficult to create three-dimensional (3D) electrodes on a micro-scale, e.g., electrodes having dimensions measured in microns or μm. While simple electrical traces or even planar electrodes can readily be formed, creating more complex free-standing electrodes (particularly electrodes with non-rectilinear paths) can be difficult. Direct 3D printing with metal or a conductive slurry (e.g., selective laser sintering or nozzle-based methods) can generally produce free standing metal structures, but only with layer thicknesses and resolutions on the order of 100 μm-150 μm. However, microelectrodes typically require features with between about 1 μm and about 10 μm resolution. Folding techniques have also been utilized that transforms 2D electronics into 3D electronics, but these techniques can suffer from the same difficulties. Existing techniques also generally do not allow for more complicated geometries, such as self-intersecting electrodes. In addition, it is challenging to selectively insulate or expose the 3D electrodes, once fabricated. Thus, new systems and methods for fabricating 3D electrodes that solve these problems and others are needed.

SUMMARY

According to aspects of the present disclosure, a method of fabricating an electrode comprises forming a three-dimensional (3D) shell having a hollow interior, the 3D shell defining one or more openings; directing an electrically conductive liquid through at least one of the one or more openings of the 3D shell such that the hollow interior of the 3D shell is at least partially filled with the electrically conductive liquid; and causing the electrically conductive liquid to solidify within the 3D shell such that an electrically conductive solid.

According to aspects of the present disclosure, a method of fabricating an electrode comprises forming a three-dimensional (3D) shell having a hollow interior, the 3D shell defining one or more openings; and directing an electrically conductive liquid through at least one of the one or more openings of the 3D shell such that the hollow interior of the 3D shell is at least partially filled with the electrically conductive liquid, such that an electrically conductive liquid electrode is formed having a shape of the hollow interior of the 3D shell.

According to aspects of the present disclosure, an injection assembly for forming an electrode, the injection assembly comprises a baseplate having a top surface and an opposing bottom surface, the baseplate defining a channel between the top surface and the bottom surface and further defining first opening in the top surface at a first end of the channel, the channel being fluidly coupled to the first opening; and a three-dimensional (3D) shell having a hollow interior positioned adjacent to the top surface of the baseplate, the 3D shell having at least one opening defined therein that is aligned with the first opening of the baseplate, such that the 3D shell covers the first opening of the baseplate, wherein the baseplate is configured to receive electrically conductive liquid such that the electrically conductive liquid flows through the channel of the baseplate and into the hollow interior of the 3D shell through the first opening defined in the top surface of the baseplate and the opening of the 3D shell.

These and other capabilities of the invention, along with the invention itself, will be more fully understood after a review of the following figures, detailed description, and claims.

BRIEF DESCRIPTION OF THE DRAWINGS

The disclosure will be better understood from the following description of exemplary embodiments together with reference to the accompanying drawings.

FIG. 12 is a probe formed from a 3D shell and multiple 3D electrodes, according to aspects of the present disclosure;

FIG. 13A is a transformer having two coil-shaped 3D electrodes, according to aspects of the present disclosure;

FIG. 13B is a Joule heater formed from a coil-shaped 3D electrode, according to aspects of the present disclosure;

Figure 1:
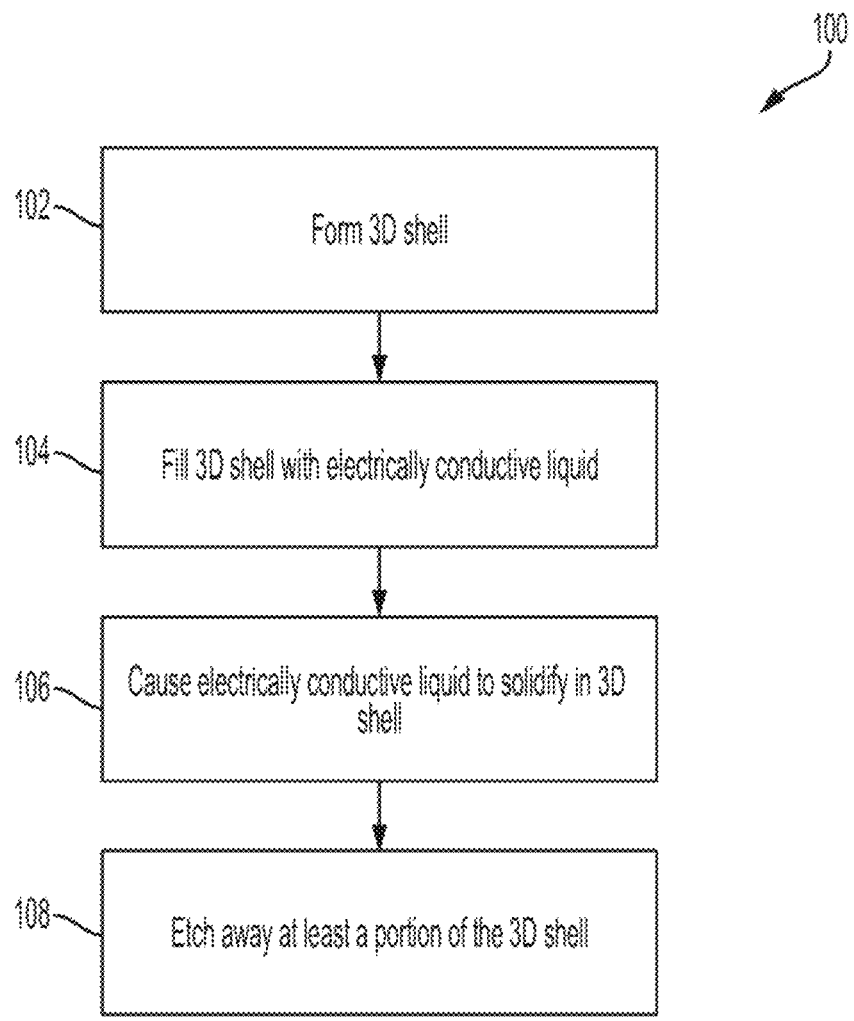
FIG. 1 is a flowchart illustrating the steps of a method for fabricating a three-dimensional (3D) shell and a 3D electrode, according to aspects of the present disclosure.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation." Additionally, the singular terms "a," "an," and "the" include plural referents unless context clearly indicates otherwise.

Figure 2A:
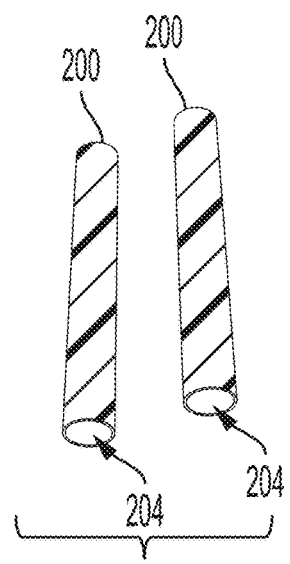
FIG. 2A is a perspective view of two 3D shells, according to aspects of the present disclosure.
Figure 2B:
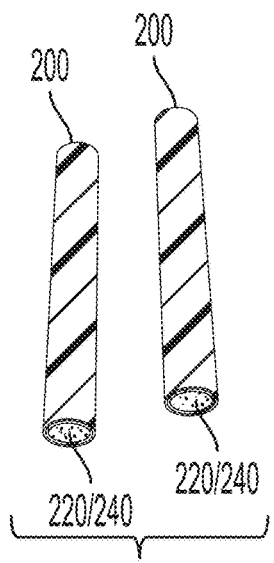
FIG. 2B is a perspective view of the 3D shells of FIG. 2A filled with an electrically conductive liquid, according to aspects of the present disclosure.
Figure 2C:
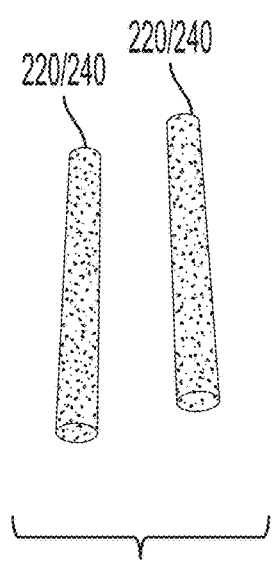
FIG. 2C is a perspective view of two electrodes formed after the 3D shells of FIG. 2B are etched away, according to aspects of the present disclosure.

FIG. 1 is a flowchart illustrating the steps of a method 100 for fabricating a 3D electrode. FIGS. 2A, 2B, and 2C illustrate various structures corresponding to the different steps of method 100. At step 102, a 3D shell 200 (see FIG. 2A) is formed. The 3D shell 200 can be formed in a variety of different manners. In some implementations, the 3D shell 200 is formed using a 3D printing process, such as a two-photon direct writing system. Other 3D printing techniques can also be used, such as fused deposition modeling, stereolithography, or selective laser sintering. In general, the 3D shell 200 may be formed using any combination of additive and subtractive manufacturing processes. The 3D shell 200 can be made of a cured polymer material, such as polyacrylates, acrylated epoxies, acrylated urethanes, silicones, IP-dip, IP-S, poly(ethylene glycol) diacrylate (PEGDA), penta erythritol triacrylate (PETA), SU-8, or polydimethylsiloxane (PDMS). The 3D shell 200 can also be formed from hydrogels such as polyacrylic acid (PAA), or polyacrylamide. In some implementations, the material forming the 3D shell 200 is electrically insulating.

As can be seen in FIG. 2A, the 3D shell 200 generally includes at least one opening 204, leading to the hollow interior of the 3D shell 200. In the illustrated implementation, each 3D shell 200 is shown with only a single opening 204. However, as discussed in more detailed herein, the 3D shell 200 can include any number of openings. At step 104 of method 100, an electrically conductive liquid 220 is flowed or injected under pressure into the hollow interior of the 3D shell 200 through the opening 204, so that the electrically conductive liquid 220 at least partially fills the hollow interior of the 3D shell 200.

In some implementations, the 3D shell 200 is cleaned and/or prepared prior to the electrically conductive liquid 220 filling the 3D shell. In these implementations, the 3D shell can be rinsed with a solvent. The solvent may be an organic solvent, such as a hydrofluoroether. In some implementations, the solvent is propylene glycol methyl ether acetate, which acts as a developer to remove residual material (e.g., leftover crosslinked or non-crosslinked material) remaining on the 3D shell 200 after the 3D shell 200 is formed.

At step 106 of method 100, the electrically conductive liquid 220 is caused to solidify within the 3D shell 200, such that an electrically conductive electrode 240 is formed. The electrode 240 generally has the same shape as the shape of the hollow interior of the 3D shell. Generally, FIG. 2B shows the 3D shell 200 filled with the electrically conductive liquid 220 (which can act as a liquid electrode) or with a solid electrode 240 after the electrically conductive liquid 220 solidifies.

In some implementations, the electrically conductive liquid 220 is solid at room temperature (between about 18° C. and about 25° C.), e.g., has a melting point at or above room temperature. The solid material is thus heated above its melting point to form the electrically conductive liquid 220, prior to the electrically conductive liquid 220 filling the 3D shell 200. In other implementations, the electrically conductive liquid 220 is a liquid at room temperatures, and does not need to be heated prior to being directed into the 3D shell 200.

To form the solid electrode 240, the electrically conductive liquid 220 can be cooled in a variety of ways. In some implementations, the electrically conductive liquid 220 solidifies naturally to form the solid electrode 240. In these implementations, the electrically conductive liquid 220 generally has a melting point at or above room temperature. In other implementations, the electrically conductive liquid 220 is externally or artificially cooled to a temperature below its melting to point, so that it solidifies into the solid electrode 240. The electrically conductive liquid 220 in these implementations could have a melting point at or above room temperature (e.g., between about 18° C. and about 25° C.), in which case the external cooling causes the electrically conductive liquid 220 to solidify more quickly than natural cooling. The electrically conductive liquid 220 could also have a melting point below room temperature, in which case the resulting solid electrode 240 must be maintained at a temperature below room temperature (e.g., between about 18° C. and about 25° C.), either by external means or by placing the solid electrode 240 in an environment with a temperature lower than between about 18° C. and about 25° C.

Finally, at step 108, the 3D shell 200 is etched away. When the 3D shell 200 is etched away, the solid electrode 240 is left being, as shown in FIG. 2C. However, step 108 is generally optional, and in certain implementations, all or part of the 3D shell 200 is retained, such that the solid electrode 240 is at least partially encapsulated within the 3D shell 200. For example, as discussed herein, different portions of the 3D shell 200 can be etched away, such that various openings or windows are defined in the 3D shell 200. The solid electrode 240 can be accessible through these openings or windows, for example to a tissue sample or to an electronic component. In other implementations, the 3D shell 200 is etched away using a combination of an alcohol and an aqueous alkaline solution. The alcohol and the aqueous alkaline solution can be used in a 1:1 ratio. The alcohol could be methanol, ethanol, isopropanol, or any other suitable alcohol. The aqueous alkaline solution could be potassium hydroxide (KOH), sodium hydroxide (NaOH), or another suitable solution. The 3D shell 200 can also be etched away using physical etching processes, such as long oxygen plasma etching or laser ablation.

Generally, any openings in the 3D shell 200 can be etched away during step 108, or can be formed as part of the 3D shell 200 when the 3D shell 200 is initially printed or formed. Thus, in certain implementations, the 3D shell 200 is first formed, and then portions of the 3D shell are subsequently etched away to form the openings. Any openings that are used to fill the 3D shell 200 with the electrically conductive liquid 220 are formed prior to the electrically conductive liquid 220 being directed into the 3D shell 200, but other openings can be etched into the 3D shell 200 before or after the electrically conductive liquid 220 fills the 3D shell 200.

The electrically conductive liquid 220 and the solid electrode 240 can be formed from a variety of different electrically conductive materials. The electrically conductive material could be a metal, such as gallium (Ga). The electrically conductive material could also be a metal alloy, such as a gallium-indium (GaIn) alloy, a eutectic gallium-indium (eGaIn) alloy, or an indium-bismuth-tin (InBiSn) alloy. Generally, the electrically conductive material does not contain any toxic material, such as lead or cadmium. However, certain implementations could include some amount of lead or cadmium, depending on the application.

In some implementations, the electrically conductive liquid 220 remains a liquid, as discussed in more detail below. In these implementations, the end product has a liquid electrode instead of a solid electrode, where the liquid electrode has generally the same shape as the hollow interior of the 3D shell. Generally, any features discussed herein are applicable to both liquid and solid electrodes. Thus, any references herein to electrodes generally refer to both liquid and solid electrodes, unless otherwise noted. For example, the steps of method 100 are generally performed the same to fabricate a device with a liquid electrode, except that the electrically conductive liquid 220 is not caused to solidify. In these implementations, the resulting device has a liquid electrode 240, instead of a solid electrode 240.

Figure 3A:
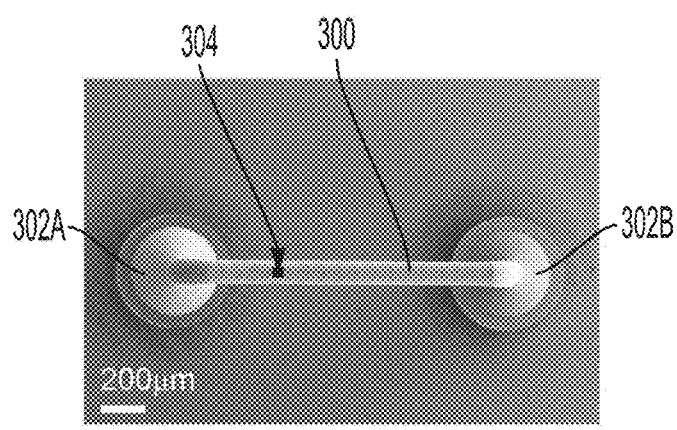
FIG. 3A is a perspective view of a 3D shell with an opening defined therein, according to aspects of the present disclosure.
Figure 3B:
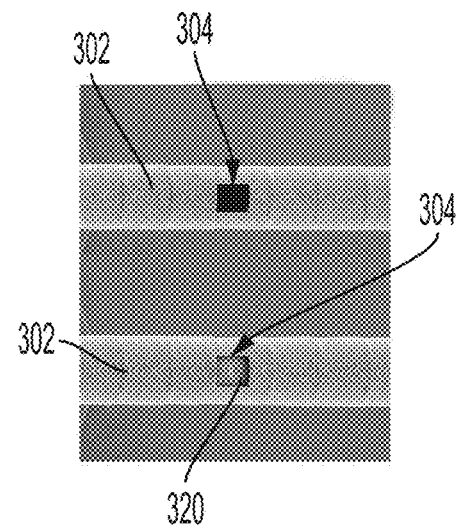
FIG. 3B is a zoomed-in perspective view of the 3D shell of FIG. 3A prior to and after being filled with an electrically conductive liquid, according to aspects of the present disclosure.

Referring now to FIGS. 3A and 3B, the 3D shell can be formed with a variety of different openings defined. FIG. 3A shows a scanning electron microscope (SEM) image of an example 3D shell 300, that is the same as or similar to 3D shell 200 of FIGS. 2A and 2B. Generally, any 3D shell referred to herein can be the same as or similar to 3D shell 200. The 3D shell 300 is shown as a tube or a pipe but could have any number of different shapes. In the illustrated implementation, the tube-shaped 3D shell 300 can have a diameter of between about 50 μm and about 250 μm, between about 100 μm and about 200 μm, or about 150 μm. However, 3D shells formed in accordance with the present disclosure can have diameters as low as about 5 μm. Other features of the 3D shells can also be on the scale of about 5 μm.

In the example of FIG. 3A, the 3D shell 300 is mounted between two base structures 302A and 302B. In some implementations, the base structures 302A and 302B may be part of the 3D shell 300, and thus may include the openings through which the 3D shell 300 is filled with electrically conductive liquid. In other implementations, the base structures 302A and 302B shown in FIG. 3A are simply used to hold the 3D shell 300 during the fabrication process, and are not present when the resulting electrode is used for a desired application.

The 3D shell 300 has an opening 304 defined therein, leading to the hollow interior of the 3D shell 300. FIG. 3B shows a zoomed-in view of the opening 304 in the 3D shell 300, both before and after the 3D shell 300 is filed with electrically conductive liquid 320 (which may be the same as or similar to electrically conductive liquid 220). Generally, any electrically conductive liquid referred to herein can be the same as or similar to electrically conductive liquid 220. As can be seen in the view of the 3D shell 300 prior to being filled with the electrically conductive liquid 320, the opening 304 leads into the hollow interior of the 3D shell 300. Once the electrically conductive liquid 320 fills the 3D shell 300, the resulting electrode is accessible through the opening 304. FIG. 3B illustrates that the 3D shell 300 can completely encapsulate and insulate the electrode, and that desired portions of the electrode can be exposed as needed.

Advantageously, the opening 304 in the 3D shell 300 does not have to formed after the 3D shell 300 is filled with the electrically conductive liquid 320 and the resulting electrode is formed. Rather, the opening 304 can already be formed in the 3D shell 300 when the electrically conductive liquid 320 is directed into the 3D shell 300. The surface tension of the electrically conductive liquid 320 prevents the electrically conductive liquid 320 from spilling out of the opening 304, or any other openings in the 3D shell 300.

Figure 4A:
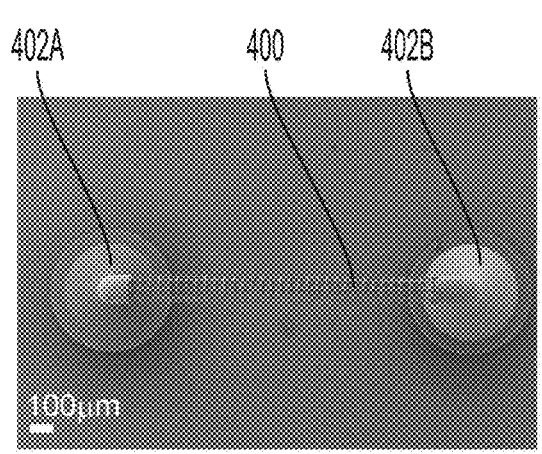
FIG. 4A is a perspective view of 3D mesh, according to aspects of the present disclosure.
Figure 4B:
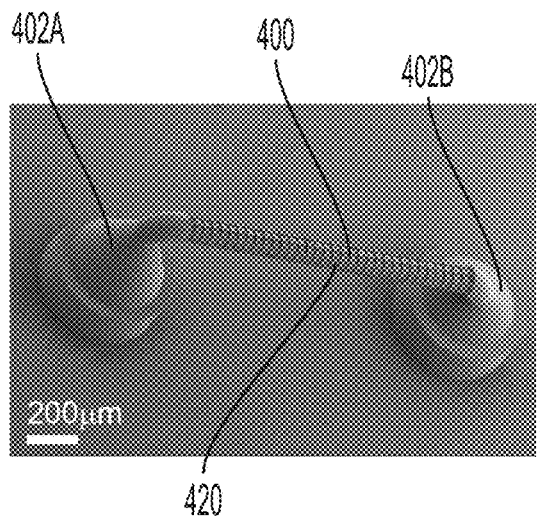
FIG. 4B is a perspective view of the 3D mesh of FIG. 4A filled with an electrically conductive liquid, according to aspects of the present disclosure.

Referring now to FIGS. 4A and 4B, due to the surface tension of the electrically conductive liquid, the 3D shell itself can be formed as a mesh with a plurality of openings, instead of a substantially or entirely solid shell. In FIG. 4A, the 3D shell is a mesh 400, which can be formed using the same or similar techniques as 3D shell 200 and 3D shell 300, and can be made from the same or similar material as 3D shell 200 and 3D shell 300. In FIGS. 4A and 4B, the mesh 400 is formed from a plurality of linear structures and a plurality of circular structures connecting each of the linear structures. The mesh 400 can be coupled to base structures 402A and 402B. The base structures 402A and 402B could be formed as part of the 3D shell along with the mesh 400, or can be simply used to hold the mesh 400 during the process of fabricating the resulting electrode.

FIG. 4B shows the mesh 400 after an electrically conductive liquid 420 is used to fill the mesh 400. Due to the surface tension of the electrically conductive liquid 420, the electrically conductive liquid 420 is retained within the mesh 400 and does not spill out of the mesh 400 through the variety of openings in the mesh 400. Thus, due to the surface tension of the electrically conductive liquid, a variety of different types of 3D shells can be used, having any type or number of openings. Generally, the openings formed by the mesh 400 are smaller than any opening in the used to fill the mesh 400 with the electrically conductive liquid 420. The surface tension of the electrically conductive liquid 420 prevents the electrically conductive liquid 420 from flowing out of the smaller openings formed by the mesh 400, while still allowing the mesh 400 to be filed with the electrically conductive liquid 420 through the larger openings.

Figure 5:
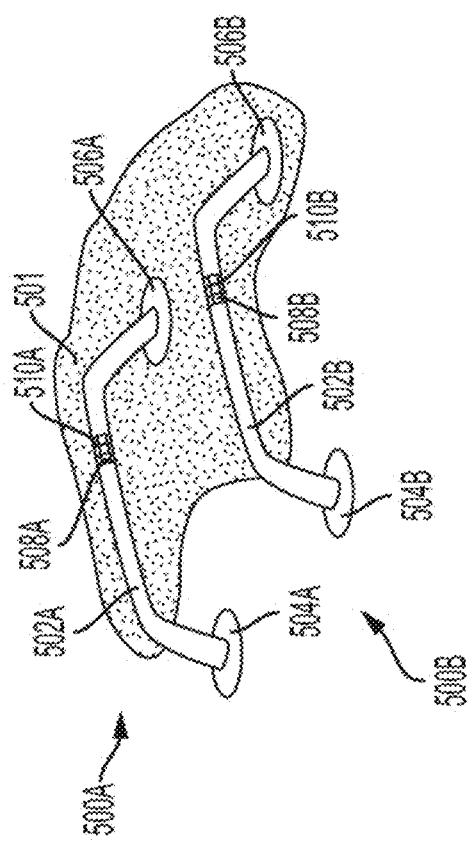
FIG. 5 is a perspective view of two 3D shells containing 3D electrodes contacting a tissue sample, according to aspects of the present disclosure.

In some implementations, the electrically conductive liquid is not caused to solidify, such that the fabricated electrode is a liquid, rather than a solid. For example, eGaIn is generally a liquid at room temperature, and can be kept as a liquid simply by allowing the device (e.g., the 3D shell and the electrically conductive liquid within) to remain at room temperature. In these implementations, the amount of the 3D shell that is etched away is selected so as to retain the liquid electrode within the 3D shell. For example, the entire 3D shell may be retained, and only a small opening is etched into the 3D shell to provide access to the liquid electrode. The 3D shell may also include one or more mesh sections, where the openings are sufficiently small such that the surface tension of the liquid electrode retains the liquid electrode within the 3D shell. Implementations with liquid electrodes may be useful in applications that involve physically moving parts or components, as the electrode can more easily maintain conductivity in liquid form. In these implementations, the liquid electrode has generally the same shape as the hollow interior of the 3D shell FIG. 5 illustrates an application of method 100 with a tissue sample. FIG. 5 shows two different 3D shells 500A and 500B. Each 3D shell 500A, 500B has a generally cylindrical body 502A, 502B that is shaped like a pipe or a tube. Each shell 500A, 500B has a first base structure 504A, 504B, and a second base structure 506A, 506B. Either or both of the first base structure 504A and the second base structure 506A of 3D shell 500A is placed on tissue sample 501. An opening (not shown) can be defined in either or both of the first base structure 504A and the second base structure 506A, so that a first portion of the electrode 508A in 3D shell 500A contacts the tissue sample 501. Similarly, either or both of the first base structure 504B and the second base structure 506B of 3D shell 500B is placed on tissue sample 501, and an opening (not shown) can be defined in either or both of the first base structure 504B and the second base structure 506B, so that a first portion of the electrode 508B in 3D shell 500B contacts the tissue sample 501

The 3D shells 500A, 500B can also form meshes 510A, 510B that form one or more openings in the body 502A, 502B of each 3D shell 500A, 500B. A second portion of the electrode 508A is accessible through the openings formed by mesh 510A, while a second portion of the electrode 508B is accessible through the openings formed by mesh 510B in body 502B. The 3D shells 500A, 500B can be fabricated with the meshes 510A, 510B in place, or the 3D shells 500A, 500B can be etched after fabrication to form the meshes 510A, 510B. In other implementations, meshes 510A, 510B are not present, and the 3D shells 500A, 500B instead simply have large openings through which the electrodes 508A, 508B are accessible.

Various electrical components can be electrically connected to the second portion of each electrode 508A, 508B through the meshes 510A, 510B, to thereby electrically connect the tissue sample 501 to any of the electrical components. The electrical components could include electrical probes connect to a meter, an integrated circuit, a voltage source, a current source, or any other suitable electrical component. The electrical components can be used for a variety of different functions, including stimulating or probing the tissue sample 501 or measuring various properties of the tissue sample 501.

In some implementations, the openings in the 3D shells 500A, 500B through which the electrodes 508A, 508B are accessible (to either the tissue sample 501 or the electronic components) are the openings through which the electrically conductive liquid is directed, in order to fill the 3D shells 500A, 500B. In other implementations, the 3D shells 500A, 500B can have other openings through which the electrically conductive liquid is directed.

In the example setup in FIG. 5, the tissue sample 501 can be formed from a combination of induced pluripotent stem cell (iPSC)-derived cardiomyocytes (CMs) and human Mesenchymal stem cells (hMSCs). However, electrodes fabricated in accordance with the concepts disclosed herein can generally be used with any type of tissue sample, but can also be used with other types of organic and non-organic matter as needed.

Figure 6B:
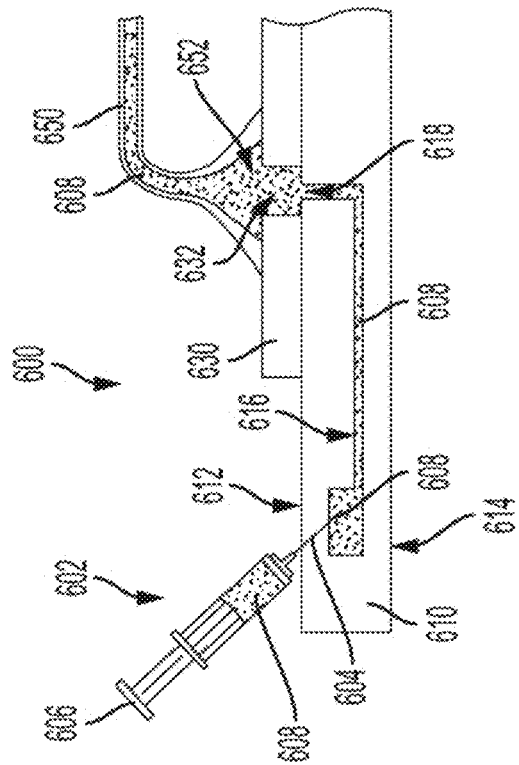
FIG. 6B is a side view of a syringe being used to the 3D shell of FIG. 6A with the electrically conductive liquid, according to aspects of the present disclosure.
Figure 6A:
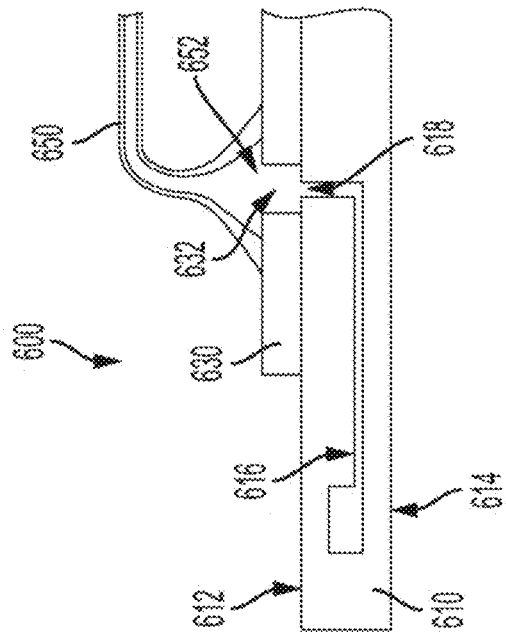
FIG. 6A is a side view of an injection assembly for filling a 3D shell with an electrically conductive liquid, according to aspects of the present disclosure.

FIGS. 6A and 6B show an injection assembly 600 that can be used to fabricate an electrode. The injection assembly 600 includes a baseplate 610, a substrate 630, and a 3D shell 650. The baseplate 610 has a top surface 612 and an opposing bottom surface 614. A channel 616 is defined within the baseplate 610 between the top surface 612 and the bottom surface 614. The channel 616 is fluidly coupled to an opening 618 that is defined in the top surface 614 of the baseplate 610, such that the channel 616 is open to the environment above the baseplate 610 through the opening 618. One end of the channel 616 is positioned within the baseplate 610, while the other end of the channel 616 is positioned at opening 618. The baseplate 610 can be formed of a laminate material, such as polydimethylsiloxane (PDMS).

The substrate 630 is made of glass, and can be the substrate onto which the 3D shell 650 is directly printed when the 3D shell 650 is formed. The substrate 630 and 3D shell 650 are then placed onto the baseplate 610. The substrate 630 defines an opening 632 that is aligned with the opening 618 in the top surface 612 of the baseplate 610. Both opening 618 and opening 632 are also aligned with an opening 652 defined by the 3D shell 650.

To fill the 3D shell 650, a syringe 602 can be filled with electrically conductive liquid 608. A needle 604 of the syringe 602 then pierces the baseplate 610, and is inserted until the tip of the syringe 602 is positioned in the channel 616. A plunger 606 of the syringe 602 can then be depressed, causing the electrically conductive liquid 608 to flow out of the syringe 602, through the channel 616, and into the 3D shell 650 through openings 618, 632, and 652. The substrate 630 aids in maintaining a substantially or complete fluid-tight seal between the baseplate 610 and the 3D shell 650, which prevents any of the electrically conductive liquid from leaking out of the injection assembly 600 at the interface of the baseplate 610 and the 3D shell 650.

In the illustrated implementation, the channel 616 is sealed at one end within the baseplate 610 between the top surface 612 and the bottom surface 614. In other implementations however, the baseplate 610 may define an additional opening in the top surface 612, that is uncovered by the substrate 630 and the 3D shell 650. This other opening can be positioned at the other end of the channel 616. In this implementation, the electrically conductive liquid can be directed into the channel 616 through the additional opening, without having to pierce the baseplate 610. In still other implementations, the syringe 602 can be used to directly inject electrically conductive liquid into the 3D shell 650, without the use of the baseplate 610 and the substrate 630. In implementations where the injection assembly 600 is fluid tight, the electrically conductive liquid may be directed into the 3D shell 650 using vacuum pressure. To achieve this, any openings in the 3D shell 650 are first covered, and then a vacuum is applied to create a lower pressure inside the 3D shell 650 as compared to outside the 3D shell 650. The 3D shell is then vented to the channel 616, which causes the electrically conductive liquid to autofill the 3D shell 650.

Figure 7A:
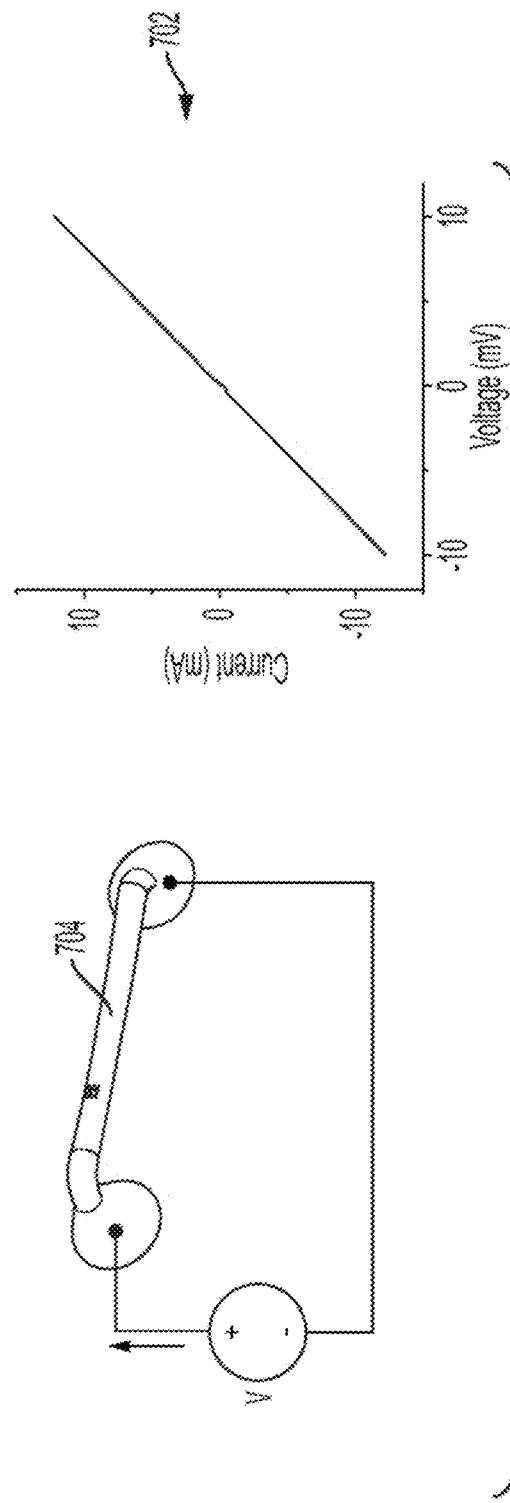
FIG. 7A is a plot of the resistance of a 3D electrode, according to aspects of the present disclosure.
Figure 7B:
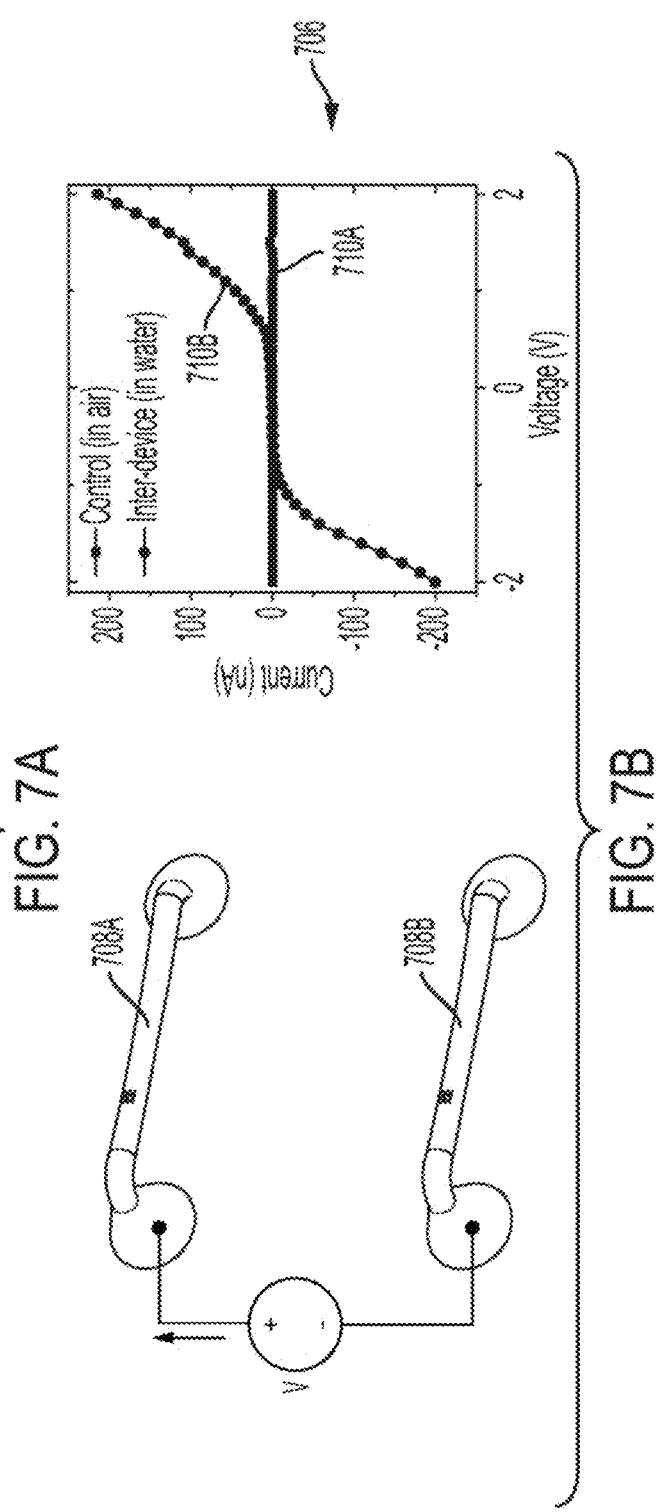
FIG. 7B is a plot of the resistance between two 3D electrodes in air and in an aqueous environment, according to aspects of the present disclosure.

Referring now to FIGS. 7A and 7B, the metals used to form the electrodes (e.g., Ga, eGaIn, InBiSn) form highly conductive electrodes. FIG. 7A shows a plot 702 of the current through electrode 704 as a function of the applied voltage. In the example shown in FIG. 7A, the electrode 704 has a pipe or tube shape, with a length of about 1.5 millimeters, and a diameter of about 150 µm. As the plot 702 in 7A shows, the current (measured in milliamps) is generally equal to the applied voltage (measured in millivolts), meaning that the electrode 704 has a resistance of about 1 ohm.

FIG. 7B shows a plot 706 of the current (nanoamps) versus applied voltage (volts) between two electrodes 708A, 708B (e.g., the "inter-electrode" resistance), both in air (data points 710A) and in an aqueous environment (data points 710B). In air, the resistance between the electrodes is high, as expectedly little to no current flows between the two electrodes. In an aqueous environment (for example if the ends of both electrodes are submerged in water), the resistance is much lower, supporting the flow of current through the aqueous environment.

Figure 8A:
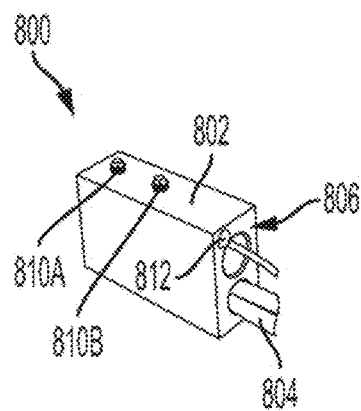
FIG. 8A is a perspective view of a heater used to melt solid material into electrically conductive liquid, according to aspects of the present disclosure.
Figure 8B:
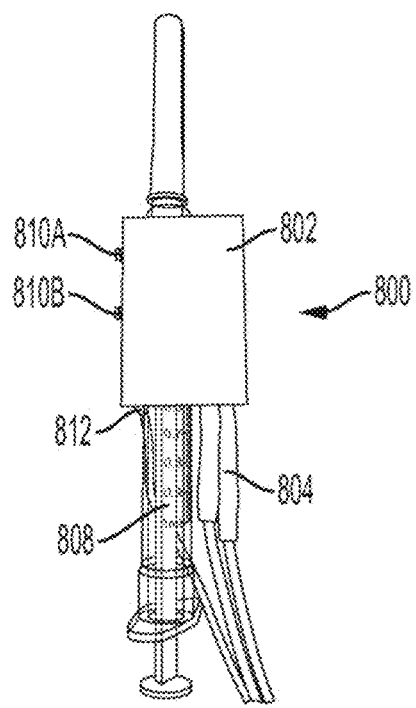
FIG. 8B is a side view of a syringe filled with the solid material being melted by the heater of FIG. 8A, according to aspects of the present disclosure.

FIGS. 8A and 8B show a heater 800 that can be used to melt solid material into the electrically conductive liquid, prior to filling a 3D shell with the electrically conductive liquid. The heater 800 includes a body 802 defining a plurality of cavities. The body 802 is generally formed from a thermally conductive material, such as metal. A heating element 804 can be inserted into one of the cavities, and is used to heat the body 802. In one implementation, the heating element 804 is a 12-volt cartridge heater. Another of the cavities (shown as cavity 806) is used to hold a container with the solid material. As shown in FIG. 8B, the container can be a syringe 808. The solid material can be inserted into the syringe 808, which is then inserted into the cavity 806. As the body 802 of the heater 800 is heated by the heating element 804, the solid material in the container melts, forming an electrically conductive liquid that is used to fill a 3D shell.

The heater 800 may include one or more fastening elements 810A, 810B to secure the syringe 808 in the cavity 806. The fastening elements 810A, 810B can be setscrews, pins, clamps, etc. The heater 800 can also include a thermocouple 812 (such as a K-type thermocouple) configured to monitor the temperature of the body 802. The output of the thermocouple can be used to regulate the temperature of the body 802.

Figure 9A:
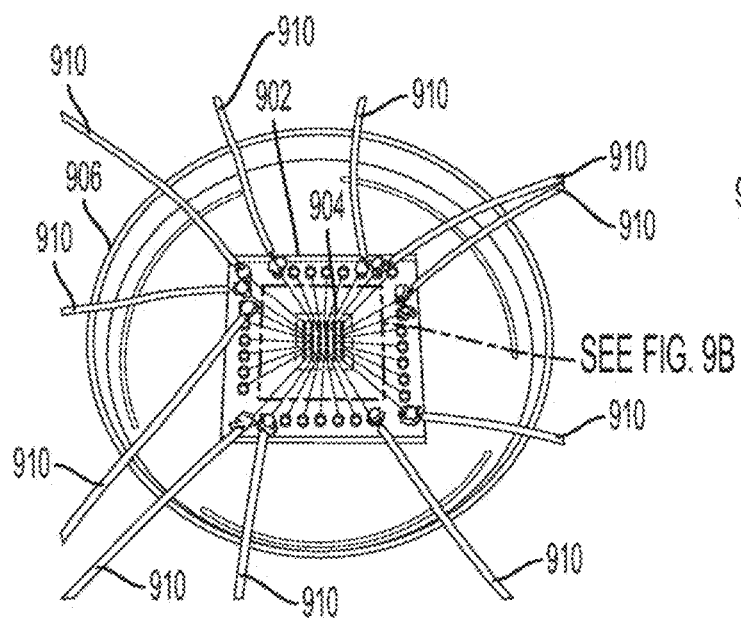
FIG. 9A is top view of a chip containing multiple 3D electrodes, according to aspects of the present disclosure.
Figure 9B:
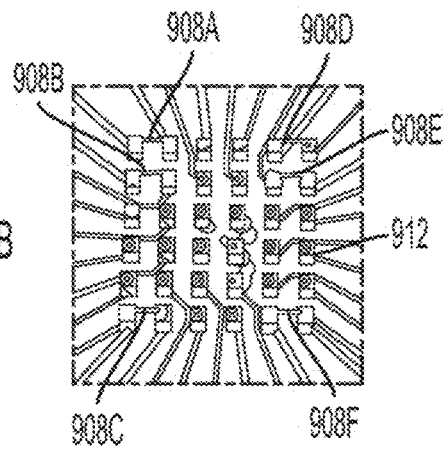
FIG. 9B is a zoomed-in top view of the chip of FIG. 9A, according to aspects of the present disclosure.

The techniques and materials disclosed herein can be used to fabricate a variety of different devices. FIG. 9A shows a 1-inch by 1-inch coverslip 902 mounted on a PDMS chip 904. For purposes of demonstration, the coverslip 902 and the PDMS chip 904 are mounted in a carrier 906. FIG. 9B is a zoomed-in view of the coverslip 902, showing a variety of electrodes 908A-908F. Each electrode 908A-908F bridges two holes in the coverslip, which lead to channels in the PDMS chip. During fabrication, 3D shells are printed over the pairs of holes, and the channels in the PDMS chip are used to fill the 3D shells with electrically conductive liquid, to thereby form the electrodes 908A-908F. Afterwards, the channels can also be filled with electrically conductive material, and then connected to wires 910 to form electrical contacts. The electrically conductive liquid also forms solid electrical contacts at holes that are not bridged to other holes, one of which is denoted with reference numeral 912.

Figure 9C:
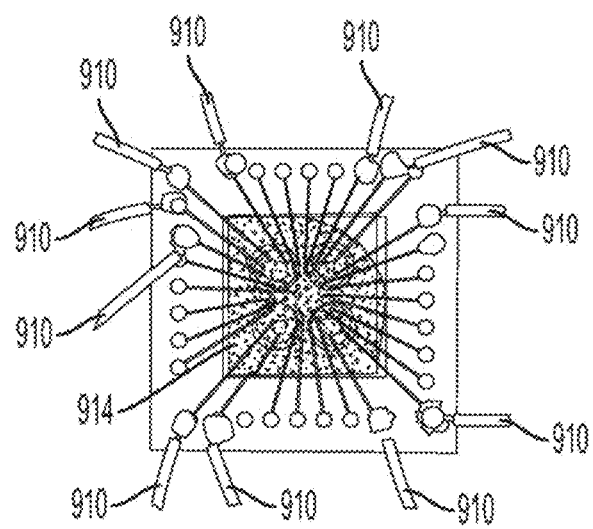
FIG. 9C is a top view of the 3D electrodes of FIG. 9A mounted on a tissue sample, according to aspects of the present disclosure.

In FIG. 9C, iPSC-derived CMs and hMSCs have been used to form self-assembled cardiac microtissue 914 surrounding the electrodes. The microtissue 914 can be monitored, probed, etc. using the wires 910, the electrodes 908A-908F (shown in FIG. 9B), and the electrical contacts 912 (shown in FIG. 9B). Generally, electrodes 908A-908F are solid electrodes, but could also be liquid electrodes.

Figure 10A:
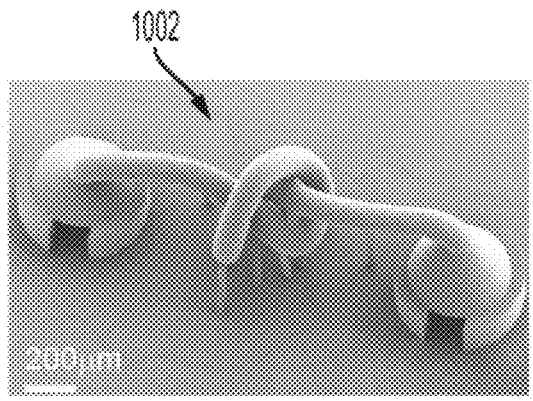
FIG. 10A is a perspective view of a 3D shell having a self-intersecting shape, according to aspects of the present disclosure.
Figure 10B:
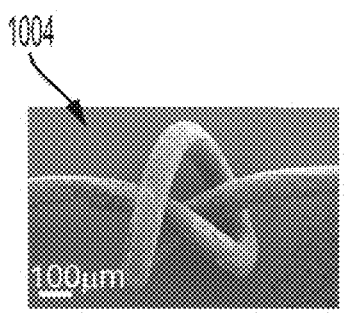
FIG. 10B is a perspective view of a 3D electrode having a self-intersecting shape and being fabricated by the 3D shell of FIG. 10A, according to aspects of the present disclosure.

FIG. 10A shows an SEM image of a 3D shell 1002 with a self-intersecting shape, while FIG. 10B shows an SEM image of the resulting solid electrode 1004 with the same self-intersecting shape. The 3D shell 1002 was formed with a number of support struts to allow the 3D shell 1002 to be formed with a proper amount of structural integrity. As can be seen in FIG. 10B, the use of the 3D shell 1002 allows for electrodes with complex topology to be formed, for example the knot that is formed with solid electrode 1004. Liquid electrodes with complex topology can also be formed, so long as at least some of the 3D shell is retained.

Figure 11:
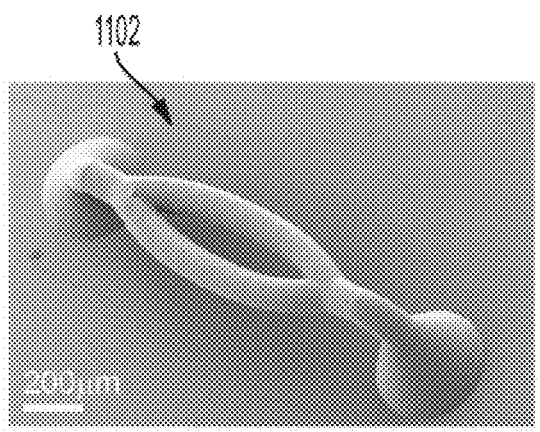
FIG. 11 is a perspective view of a 3D shell having two separate branches, according to aspects of the present disclosure.

FIG. 11 shows another example device that can be fabricated using the techniques disclosed herein. FIG. 11 shows a 3D shell 1102 that has been formed with two separate branches. This fork-like structure of the resulting electrode allows for the splitting and/or merging of electrical signals.

FIG. 12 shows an electrical probe that can be fabricated using the disclosed techniques. In FIG. 12, the 3D shell forms a probe housing 1202 having a cylindrical body 1204 tapering to a tip 1205, and a flared base 1206. The probe housing 1202 defines multiple interior channels that can be filled with electrically conductive liquid, to form a plurality of electrodes 1208A-1208D. The probe housing 1202 also defines a plurality of windows 1210A-1210D, through which a respective one of the electrodes 1208A-1208D is accessible. The probe housing 1202 is made of an electrically insulating material, and thus the electrodes 1208A-1208D form a plurality of electrically isolated probe channels. In the illustrated implementations, electrode 1208B is accessible through window 1210B located at the tip 1205 of the cylindrical body 1204, while electrodes 1208A, 1208C, and 1208D are all accessible through windows 1210A, 1210C, and 1210D located on the sides of the cylindrical body 1204. However, the probe housing 1202 can be printed or etched in any desired manner, so as to located windows 1210A-1210D at any suitable location. Generally, electrodes 1208A-1208D are solid electrodes, but could also be liquid electrodes.

FIGS. 13A and 13B show implementations where the 3D shell and the resulting solid electrode are formed having coil shapes, e.g., spiral, helical, or toroidal shapes. FIG. 13A shows two electrodes 1302A and 1302B wrapped around a core 1304. The electrodes 1302A, 1302B thus form coils of a miniature transformer. In some implementations, the core 1304 is formed from a 3D shell that is filled with a soft magnetic material (instead of the electrically conductive liquid used for electrodes 1302A, 1302B), and then optionally etched away. FIG. 13B shows an electrode 1306 that forms a Joule heating coil, e.g., a metal coil heated by resistive heating. Spiral, helical, or toroidal solid electrodes can also be used as dense, miniaturized magnetic field sources. Generally, the spiral electrodes 1302A, 1302B, and 1306 are solid electrodes, but could also be liquid electrodes within the spiral 3D shells.

Figure 14:
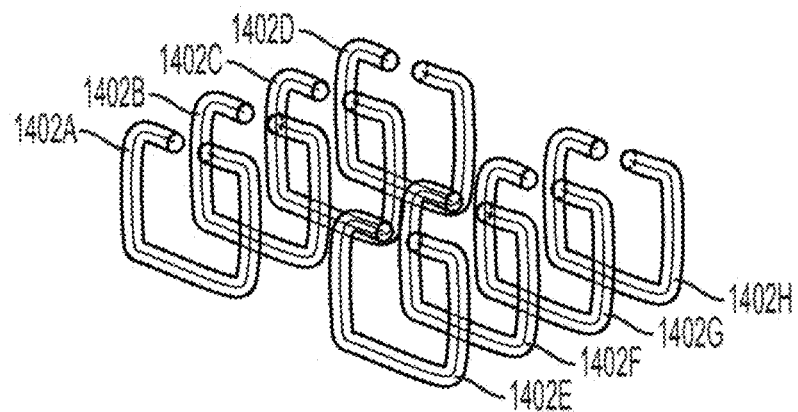
FIG. 14 is split-ring resonator array formed from multiple U-shaped 3D electrodes, according to aspects of the present disclosure.

In FIG. 14, U-shaped 3D shells are used to form U-shaped electrodes 1402A-1402H. These U-shaped electrodes 1402A-1402H can be used to form an array of split-ring resonators. Generally, the U-shaped electrodes 1402A-1402H are solid electrodes, but could also be liquid electrodes within the U-shaped 3D shells.

Figure 15:
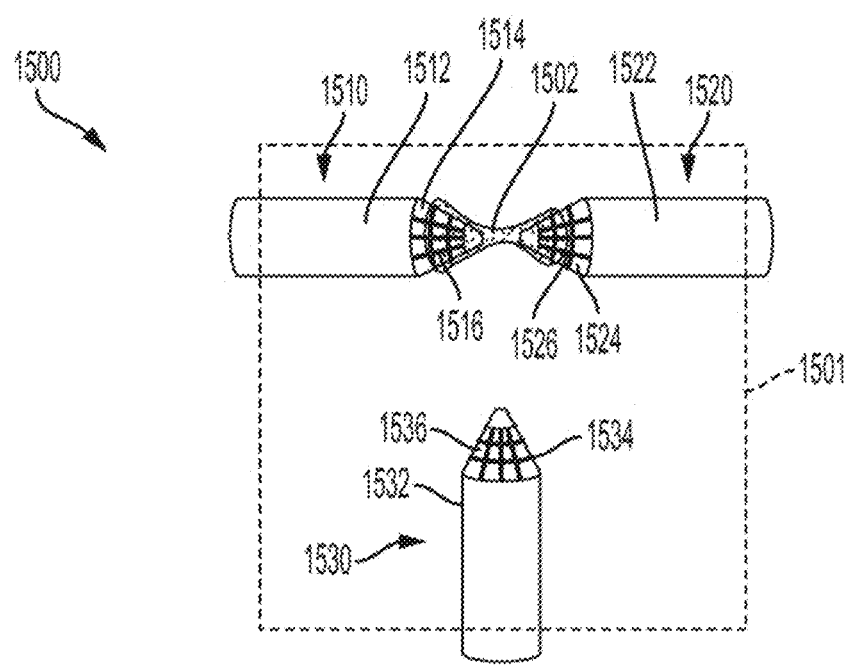
FIG. 15 is a transistor formed from multiple 3D shells and multiple 3D electrodes, according to aspects of the present disclosure.

FIG. 15 shows a transistor 1500 with a source 1510, a drain 1520, and a gate 1530. Each of the source 1510, a drain 1520, and a gate 1530 are formed from 3D shells having generally solid cylindrical bodies 1512, 1522, 1532 with mesh tips 1514, 1524, 1534. The 3D shells are then filled with the electrically conductive liquid to form electrodes 1516, 1526, 1536. A conductive polymer and or semiconductor, such as poly(3,4-ethylenedioxythiophene) polystyrene sulfonate (otherwise known as PEDOT:PSS) can be applied to electrode 1516 of the source 1510, and electrode 1526 of the gate 1530, to thereby form the channel 1502 of the transistor 1500. Electrode 1536 of the gate 1530 tunes the conductivity of the channel 1502. Electrodes 1516, 1526, and 1536 could be liquid electrodes or solid electrodes.

Figure 16A:
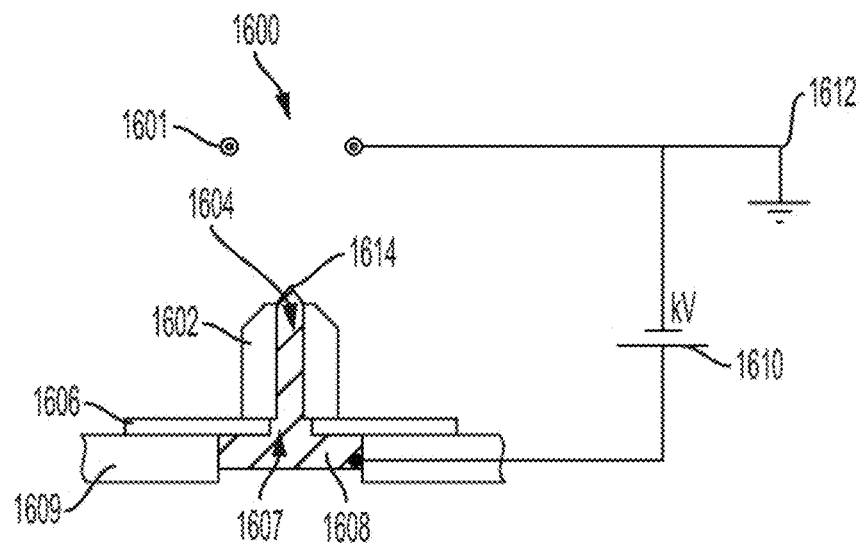
FIG. 16A is a side view of an electrospray thruster formed from a ring-shaped 3D electrode and a hollow 3D shell, according to aspects of the present disclosure.
Figure 16B:
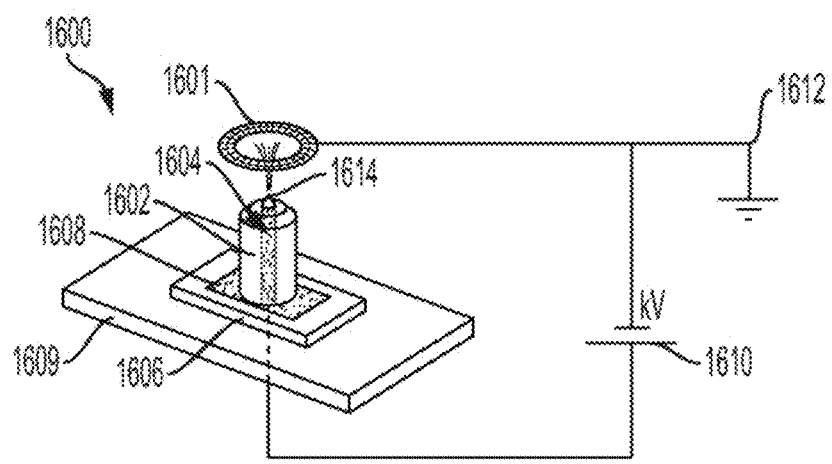
FIG. 16B is a perspective view of the electrospray thruster of FIG. 16A.

FIGS. 16A and 16B show an electrospray thruster 1600. The electrospray thruster 1600 includes an extractor 1601 and a hollow tube 1602. The extractor 1601 is generally a ring-shaped electrode (solid or liquid) that may be disposed within a corresponding ring-shaped 3D shell. The hollow tube 1602 is formed as a 3D shell according to the techniques disclosed herein, but generally does not have a corresponding electrode. The hollow tube 1602 defines a central channel 1604 with an axis that is generally coaxial with an axis of the extractor 1601, as can be seen in FIG. 16B. While the extractor 1601 is shown as a ring, the extractor 1601 can also have a generally cylindrical shape and extend further towards the hollow tube 1602.

The hollow tube 1602 is printed onto a substrate 1606 (which may be glass), which itself may be positioned on a baseplate 1609. The substrate 1606 defines an opening 1607 that is aligned with the central channel 1604. The hollow tube 1602 and the substrate 1606 are positioned over a pool of ionic liquid 1608. In some implementations, the baseplate 1609 may be part of a reservoir containing the ionic liquid 1608. When a voltage source 1610 is applied between the extractor 1601 and the ionic liquid 1608, and the extractor 1601 is grounded by ground 1612, a Taylor cone 1614 is formed at the tip of the extractor 1601, and a stream of ions is emitted from the extractor 1601, thus forming a self-aligned micro-thruster.

Figure 17:
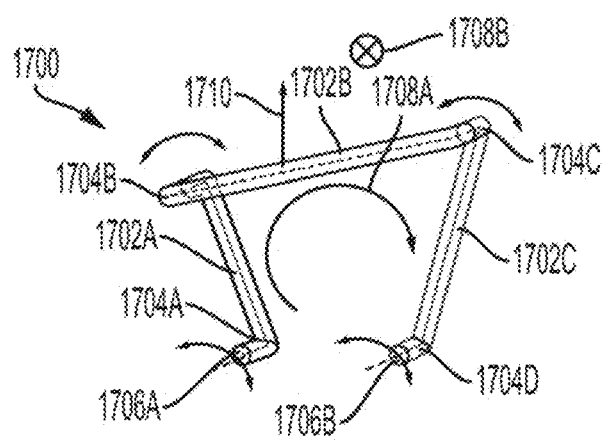
FIG. 17 is a Lorentz force actuator formed from a 3D shell and one or more 3D electrodes, according to aspects of the present disclosure.

FIG. 17 shows a Lorentz force actuator 1700 that can act like a mechanical four bar linkage. The actuator 1700 includes three arms 1702A, 1702B, and 1702C, that are formed as 3D shells according to the techniques disclosed herein. The arms 1702A, 1702B, and 1702C have corresponding electrodes (not shown) positioned inside them, which may be liquid electrodes or solid electrodes. The actuator 1700 also includes smaller arm 1706A positioned at an end of arm 1702A, and smaller arm 1706B positioned at an end of arm 1702B. The smaller arms 1706A and 1706B can be coupled to each other, or can be coupled to various other physical objects.

The various arms are all coupled to each other via rotational joints, such that the arms can rotate relative to each other. Small arm 1706A and arm 1702A are coupled by rotational joint 1704A, and can thus rotate relative to each other. Arm 1702A and arm 1702B are coupled by rotational joint 1704B, and can thus rotate relative to each other. Arm 1702B and arm 1702C are coupled by rotational joint 1704C, and can thus rotate relative to each other. Arm 1702C and small arm 1706B are coupled by rotational joint 1704D, and can thus rotate relative to each other.

Generally, two different external influences are applied to actuator 1700. The first is that current is caused to flow through arms 1702A, 1702B, and 1702C, as denoted by loop 1708A. Concurrently, a magnetic field is applied to the actuator 1700. The magnetic field is directed into the plane of FIG. 17, as indicated by vector 1708B. Together, the current in a respective arm and the magnetic field exert a physical force on that respective arm that is perpendicular to both the current flow and the magnetic field. The resulting force on arm 1702A is to the left with respect to the plane of FIG. 17, while the resulting force on arm 1702C is to the right with respect to the plane of FIG. 17. The forces on arms 1702A, 1702C thus cancel out, and the remaining upward force on arm 1702B is the only force acting on the actuator 1700, thus causing the actuator 1700 to move in that direction. The current flowing through the arms 1702A, 1702B, 1702C and the magnetic field applied to the actuator 1700 can be controlled and modified to achieve any desired movement or pattern of movement of the actuator 1700.

Generally, the electrodes within the arms 1702A, 1702B, 1702C are liquid electrodes, which allows the conductive path between arms 1702A, 1702B, 1702C to more easily be maintained while the various components of the actuator 1700 move. However, in some implementations, solid electrodes can also be used.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the invention. It is also contemplated that additional embodiments according to aspects of the present invention may combine any number of features from any of the embodiments described herein.

What is claimed is:

1. A method of fabricating an electrode, comprising:
   forming a three-dimensional (3D) shell having a hollow interior, the 3D shell being a mesh that defines a plurality of openings;
   directing an electrically conductive liquid through at least one of the plurality of openings of the 3D shell such that the hollow interior of the 3D shell is at least partially filled with the electrically conductive liquid; and causing the electrically conductive liquid to solidify within the 3D shell such that an electrically conductive solid electrode is formed having a shape of the hollow interior of the 3D shell.

2. The method of claim 1, wherein the 3D shell is initially formed with the plurality of openings defined therein.

3. The method of claim 1, wherein the 3D shell is initially formed without the plurality of openings defined therein, and the method further comprises etching away at least a portion of the 3D shell to define the plurality of openings.

4. The method of claim 1, further comprising etching away at least a portion of 3D shell from the electrically conductive solid electrode.

5. The method of claim 4, further comprising etching away all of the 3D shell from the electrically conductive solid electrode.

6. The method of claim 4, wherein the portion of the 3D shell is etched away to define the plurality of openings in the 3D shell thereby allowing the electrically conductive solid electrode to be accessible.

7. The method of claim 1, wherein a portion of the electrically conductive solid electrode is configured to contact a tissue sample through at least one of the plurality of openings in the 3D shell.

8. The method of claim 1, wherein the 3D shell is retained after the electrically conductive solid electrode is formed such that the electrically conductive solid electrode is at least partially encapsulated by the 3D shell.

9. The method of claim 1, wherein the plurality of openings of the 3D shell include a first opening, and wherein a first portion of the electrically conductive solid electrode is configured to contact a portion of a tissue sample through the first opening.

10. The method of claim 9, wherein the plurality of openings of the 3D shell include a second opening, and wherein a second portion of the electrically conductive solid electrode is configured to be electrically connected to an electronic component through the second opening.

11. The method of claim 10, wherein the electronic component is an integrated circuit, a voltage source, a current source, a meter, or any combination thereof.

12. The method of claim 9, wherein the at least one of the plurality of openings of the 3D shell through which the electrically conductive liquid is directed is the first opening of the 3D shell.

13. The method of claim 1, further comprising melting a base material to form the electrically conductive liquid prior to directing the electrically conductive liquid into the 3D shell.

14. The method of claim 1, wherein the 3D shell is generated using a 3D printing process.

15. The method of claim 1, wherein the 3D shell is formed using a two-photon direct writing system.

16. The method of claim 1, wherein the 3D shell is made of an electrically insulating material.

17. The method of claim 1, wherein the electrically conductive solid electrode is made of a metal or a metal alloy.

18. The method of claim 17, wherein the metal is gallium.

19. The method of claim 17, wherein the metal alloy is a gallium-indium (GaIn) alloy, a eutectic gallium-indium (eGaIn) alloy, or an indium-bismuth-tin (InBiSn) alloy.

20. The method of claim 17, wherein the electrically conductive solid electrode does not contain lead or cadmium.

21. The method of claim 1, wherein surface tension of the electrically conductive liquid retains the electrically conductive liquid within the 3D shell after the electrically conductive liquid is directed into the 3D shell.

22. The method of claim 1, wherein the electrically conductive liquid is formed by heating solid material.

23. The method of claim 1, wherein the electrically conductive liquid is directed through the at least one of the plurality of openings of the 3D shell using a syringe, or using vacuum pressure.

24. The method of claim 1, wherein the electrically conductive solid electrode has a self-intersecting shape, a coil shape, or a U-shape.

* * * * *